Dec. 19, 1967  R. E. KEMP  3,358,896
FULL-CIRCLE WELDING MACHINE
Filed May 10, 1965  3 Sheets-Sheet 1

INVENTOR.
ROBERT E. KEMP
BY

INVENTOR.
ROBERT E. KEMP
BY
ATTY.

Dec. 19, 1967 R. E. KEMP 3,358,896
FULL-CIRCLE WELDING MACHINE
Filed May 10, 1965 3 Sheets-Sheet 3

INVENTOR.
ROBERT E. KEMP
BY

United States Patent Office 3,358,896
Patented Dec. 19, 1967

3,358,896
FULL-CIRCLE WELDING MACHINE
Robert E. Kemp, Grand Rapids, Mich., assignor to McInerney Spring & Wire Company, Grand Rapids, Mich., a corporation of Michigan
Filed May 10, 1965, Ser. No. 454,375
5 Claims. (Cl. 228—29)

This invention relates to the construction of automatic welding machines, and the preferred form of the invention has been developed to weld the full periphery of an elongated primary tube at its opposite ends. Where these tubes join with transverse tubes to form an extensive structure, it is difficult to provide a full 360° of relative rotation between the work piece and a torch because of interference between the welded structure and the components of the machine. A machine embodying this invention produces this extent of relative rotation by rotating the work piece assembly in one direction with respect to the fixed frame of the machine, and by coaxially rotating the welding torch in the opposite direction enough that the total of the two movements will cover the full periphery of the junction.

In the preferred form of the invention, the torch is mounted on a carrier that moves in an arcuate guideway on the fixed frame of the machine. The guideway structure is supported on a cantilever portion of the frame that reaches into the space defined by the movement of the components of the work piece assembly as it rotates. The extent of possible rotation of the work piece assembly is therefore limited by its possible engagement with the opposite sides of the cantilever portion of the frame. Movement of the torch carrier in the guideway supplies this sector of rotation. The machine is readily adaptable to particular jobs by appropriate location of the frame components so that interference is minimized.

The several features of the invention will be analyzed in detail through a discussion of the particular embodiments illustrated in the accompanying drawings. In the drawings.

Figure 1:
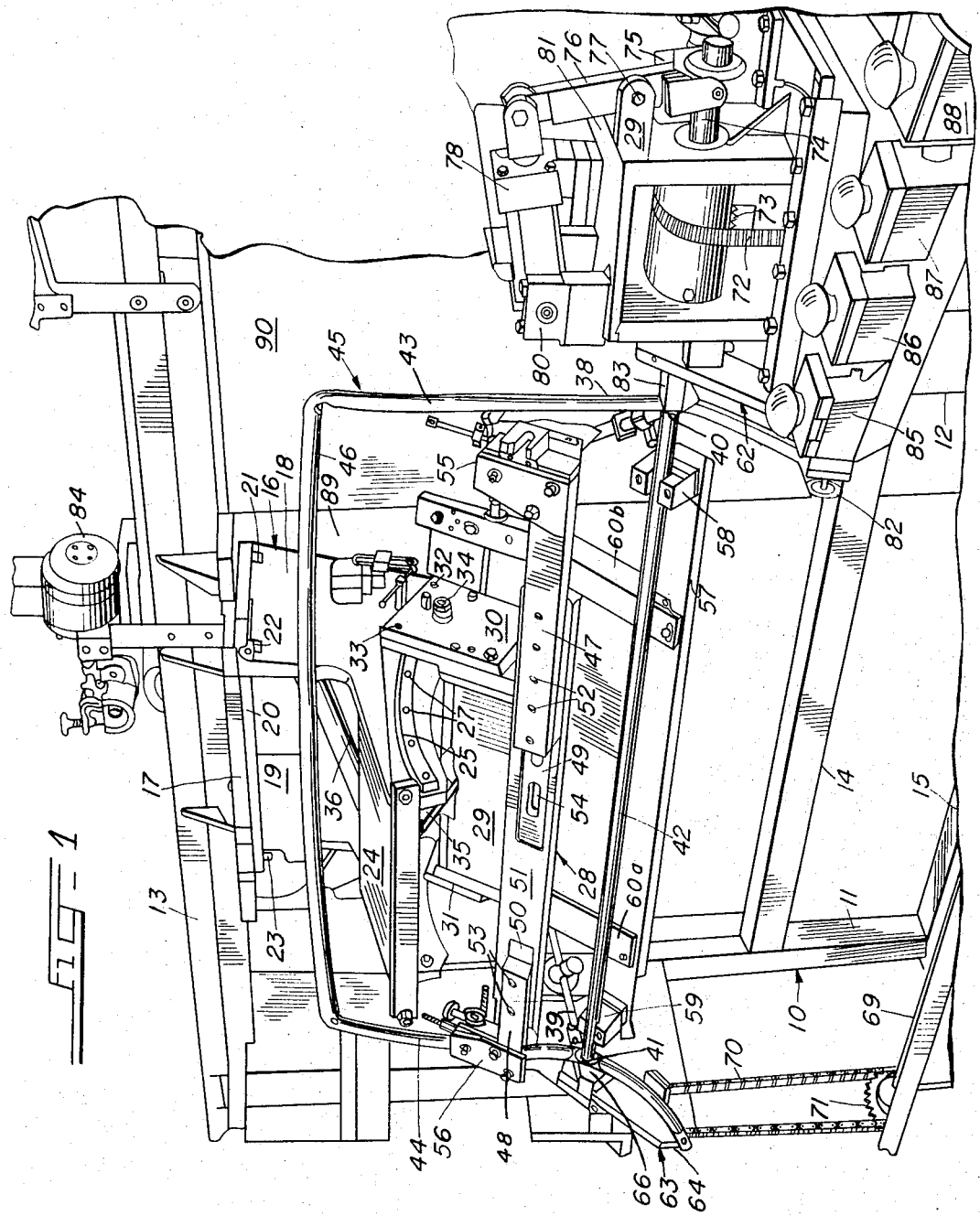
FIGURE 1 is a perspective view showing a work piece structure engaged with the machine, with the torch carrier in a position corresponding to the end of the welding operation.
Figure 2:
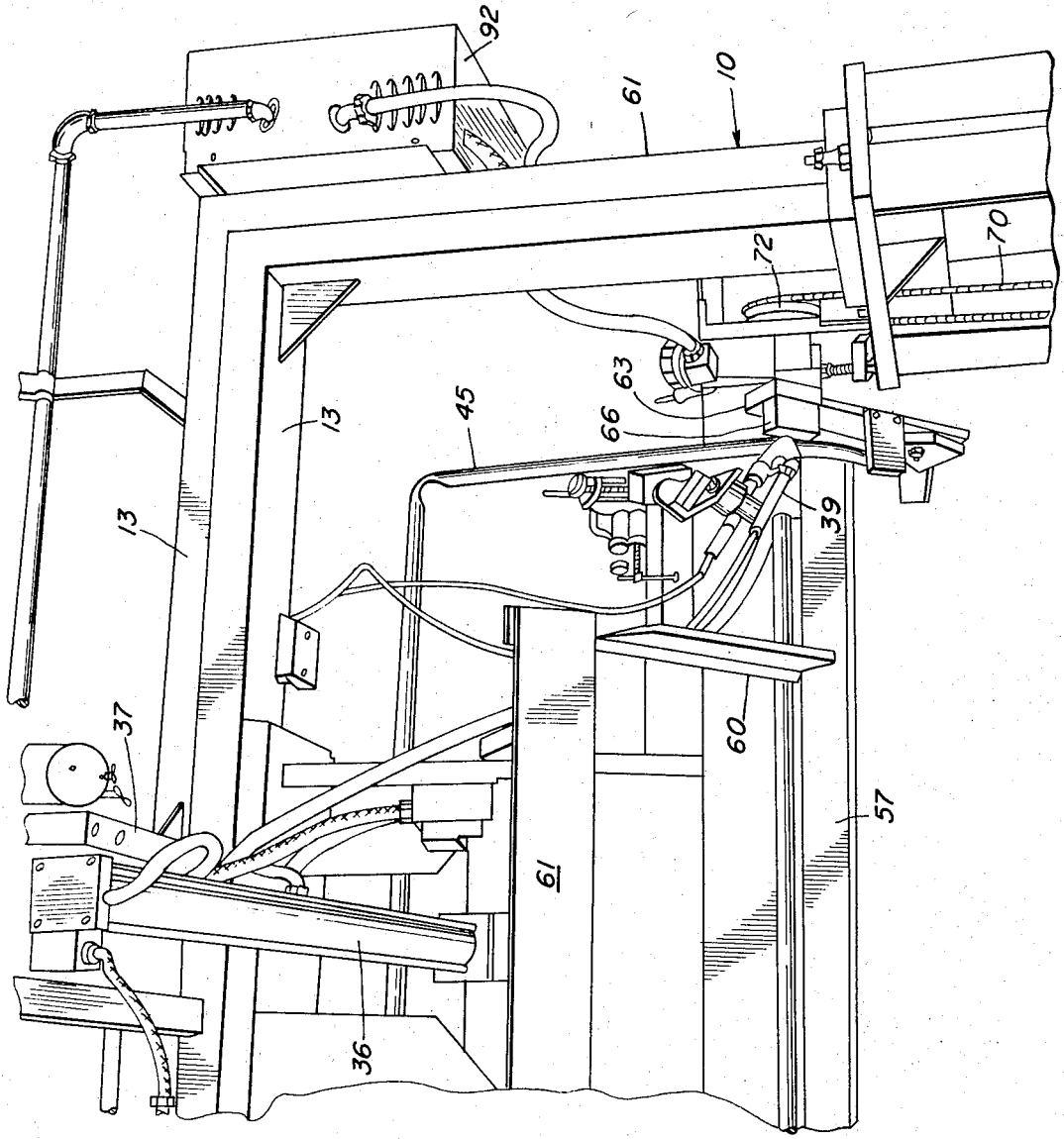
FIGURE 2 is a fragmentary perspective view on an enlarged scale, taken from the rear of the machine.
Figure 3:
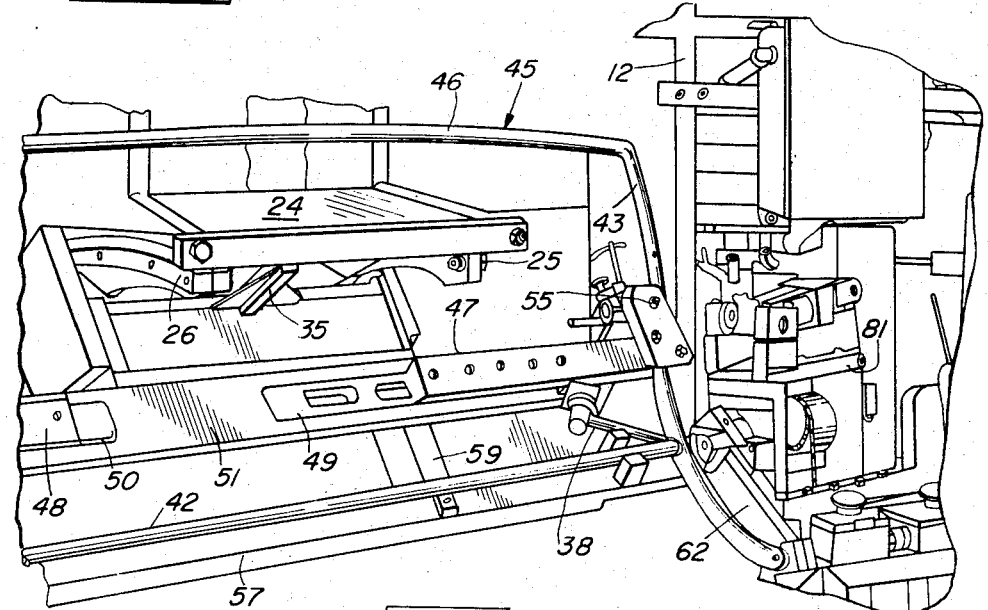
FIGURE 3 is a perspective view of one side of the machine, showing particularly the clamping arrangement for securing the work piece assembly.
Figure 4:
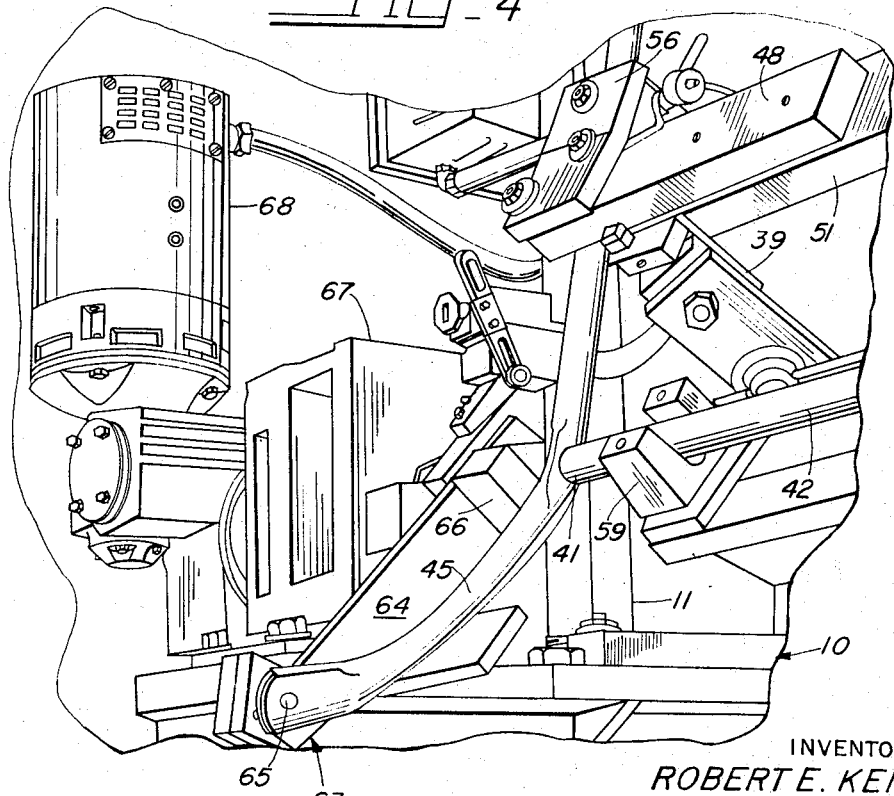
FIGURE 4 is a view of the opposite side of the machine from that shown in FIGURE 3, and illustrates portions of the drive mechanism.

Referring to the drawings, the fixed frame of the machine generally designated at 10 includes the vertical posts 11 and 12 interconnected by the upper beam 13, and by intermediate and lower members as shown at 14 and 15 in FIGURE 1. A rigidly-constructed guideway bracket generally indicated at 16 is secured to the mounting plate 17 welded to the top beam 13. The bracket 16 is formed by a pair of heavy parallel side plates 18 and 19 interconnected by a base 20 secured to the mounting plate 17 by a group of bolts in positions such as are indicated at 21–23. The cantilever portions of the side plates 18 and 19 are interconnected by a web plate 24 to increase the rigidity of the assembly. The primary function of the bracket 16 is to provide support for the arcuate guideways 25 and 26. These are in the form of curved bars secured to the plates 18 and 19 by screws as shown at 27 in FIGURE 1.

The guideways 25 and 26 determine the arcuate path of movement of the carrier generally indicated at 28. This carrier includes the central member 29 to which the opposite end-panels 30 and 31 are secured. The structure associated with these two panels is basically the same, and includes bearing members (not shown) mounted on the pins 32 and 33 for engaging the top of the guideway bar 25, and for another bearing member (not shown) mounted on the pin 34 engaging the underside of the guideway bar 25. A horn 35 is fixed with respect to the central member 29 of the carrier, and moves in the space between the plates 18 and 19. The outer end of this horn forms a terminal for the piston rod of the actuating cylinder 36. The opposite extremity of this cylinder is pivotally mounted on the bracket 37 secured to the beam 13 of the frame of the machine. Extension of the cylinder assembly 36 will cause the carrier 28 to move forward in the guideways 25 and 26, and thereby rotate in a counterclockwise direction, as shown in FIGURE 1, about the axis of curvature of the guideways.

The primary function of the carrier 28 is to support and move the torch assemblies generally indicated at 38 and 39. This path of movement is determined so that the torches will weld the junctions 40 and 41 at the opposite ends of the primary tube 42 with the transverse portions 43 and 44 of the tube 45. This tube has a central portion 46 which completes an extended frame-like structure of tubing. This particular work piece structure forms a back frame for an automobile seat. The position of the torch assemblies 38 and 39 laterally with respect to the carrier 28 is adjustable, as a result of mounting these torch assemblies on the arms 47 and 48 located by the recesses 49 and 50 in the beam 51 secured to the central member 29 of the carrier. Screws engaging selected holes 52 in the arm 47, and the holes 53 in the arm 48, secure the arms 47 and 48 in the adjusted position. The screws traverse elongated openings in the beam 51 as shown at 54 to provide clearance for lateral adjustability. The arms 47 and 48 are both provided with a compound assembly indicated at 55 and 56 for adjusting the position of the torch assemblies in any direction. The result of the adjustability provided by the arms 47 and 48 and by the compound assemblies 55 and 56 is to permit the mechanic to locate the torch assemblies precisely to follow the junction of the tubes where welding action is to be applied. To facilitate the accurate placement of the torches with respect to the tube 42, a receptacle 57 is provided with a pair of U-shaped blocks 58 and 59 at its opposite ends for receiving the tube 42, and locating it precisely at the axis of curvature of the guideways 25 and 26. The receptacle 57 is mounted on the arms 60a and 60b welded to the beam 61 carried by the bracket 16. The tube 42 is freely insertable in the blocks 58 and 59, and rotates with respect to the blocks during the operation of the machine.

The movement of the tube structure 45 is provided by the rotatable clamping devices 62 and 63. The unit 63 has a radial arm 64 having a pin 65 positioned to engage a hole present in the tube structure 45. The arm 64 also has a locating block 66 against which the tube structure 45 may be shoved for accurate placement of the weld junction 41. The clamping unit 63 is rotatably mounted in the bearing structure 67 on a shaft driven by the gear motor 68. Rotation of the clamping device 63 is communicated to the transverse shaft 69 by the chain 70 and the sprocket 71. The chain 72 transfers power from the shaft 69 to the sprocket 73 driving the axially movable shaft 74 carrying the clamping device 62. The axial position of the shaft 74 is determined by the yoke 75 on the lever 76, and this lever is rotatively positioned about the fulcrum pin 77 by the piston-cylinder unit generally indicated at 78. The bracket 79 carrying the lever 76, and the bracket 80 pivotally supporting the opposite end of the cylinder unit 78, are fixed with respect to the bearing structure 81 mounted on the frame of the machine. Axial movement of the shaft 74 in response to the piston-cylinder unit 78 will carry the clamping device 62 between positions providing clearance for insertion of the tube assembly 45, and a clamping position in which the pin 82 engages a hole provided in the end of the tube structure 45, and the bearing block 83 shoves the tube structure 45 solidly to the left into engagement with the bearing block 66 of the opposite clamping device.

A cycle of operation would commence either with the tube structure 45 positioned as shown in FIGURE 1, or with the transverse portion 46 rotated around to the opposite side of the bracket 16. In either case, the carrier 28 would be positioned at whichever extremity of the guideways 25 and 26 would provide freedom for opposite rotation of the carrier from that of the work piece about the axis of the tube 42. Suitable conventional equipment (not shown) is incorporated for actuating the cylinder 36 controlling the movement of the carrier in the guideways, and for energizing the gear motor 68 determining the rotary movement of the tube structure 45 by the clamping units 62 and 63. These two motions can take place in sequence or simultaneously, provided that the resulting relative movement between the torches and the welded junction is maintained at a uniform appropriate velocity. In the illustrated machine, a particular form of welding is utilized in which a wire of weld material is deposited by the torches, and this material is supplied by the delivery unit indicated at 84 mounted on the top beam 13 of the machine. This is a conventional device, and forms no part of this invention. Control switches 85–88 are mounted at a location convenient to the operator, and it is preferable that these be arranged so that the machine can be operated in various fractions of its full cycle, or fully automatically. Conventional limit switches as shown at 89 in FIGURE 1 can be located to be responsive to the arrival of the carrier 28 at its extreme of movement in order to control the action of the welding equipment and the clamping cylinder 78. The degree of automation such as is possible through the use of appropriately located limit switches is a matter entirely at the option of the user of the machine. A control cabinet may be located as shown at 90 in FIGURE 1, supplemented by junction boxes as shown at 92. The location of these items is also entirely a matter of choice.

The particular embodiments of the present invention which have been illustrated and disclosed herein are for illustrative purposes only, and are not to be considered as a limitation upon the scope of the appended claims. In these claims, it is my intent to claim the entire invention disclosed herein, except as I am limited by the prior art.

I claim:
1. A machine for welding the full circumference of a particular primary member at a junction with a particular transverse member, said machine comprising:
  a frame having arcuate guideway means;
  a receptacle on said machine for rotatably receiving a primary member in a position coaxial with the axis of curvature of said arcuate guideway means;
  a carrier movably mounted in said guideway means, said carrier being provided with at least one welding torch disposed in a position to operate on a primary member mounted in said receptacle;
  clamping means rotatably mounted on said frame for gripping a transverse member, said clamping means being mounted coaxially with the axis of curvature of said guideway means;
  drive means for rotating said clamping means and for moving said carrier in said guideway means; and
  control means for said drive means adapted to establish opposite rotation of said carrier and said clamping means about the axis thereof during operation of said torch.

2. A machine as defined in claim 1, wherein said receptacle is in the form of at least one U-shaped member fixed with respect to said frame.

3. A machine as defined in claim 1, wherein said guideway means includes a pair of spaced parallel arcuate guideways, and said carrier has an extension moving between said guideways, and said drive means for moving said carrier includes a piston-cylinder device mounted on said frame and connected to said extension.

4. A machine as defined in claim 1, wherein said clamping means includes an axially movable member having a radius arm provided with means for engaging workpieces at a position spaced from said axis, and also having a portion disposed to bear on a workpiece to apply pressure thereto in a direction parallel to said axis, said member being movable away from said workpiece to disengage the same.

5. A machine as defined in claim 1, wherein said clamping means also includes spaced coaxial members each having a radius arm adapted to engage a workpiece at a point spaced from said axis, and also having portions to bear against opposite sides of a workpiece, respectively, placed between them, said members being movable axially with respect to each other to clamp and release workpieces.

No references cited.

JOHN E. CAMPBELL, *Primary Examiner.*

M. L. FAIGUS, *Examiner.*